(12) United States Patent
Alberto

(10) Patent No.: US 8,931,222 B2
(45) Date of Patent: Jan. 13, 2015

(54) ANCHORING DEVICE FOR PANEL SUPPORTING STRUCTURES

(76) Inventor: Di Gaetano Alberto, San Bonifacio (IT)

( * ) Notice: Subject to any disclaimer, the term of this patent is extended or adjusted under 35 U.S.C. 154(b) by 0 days.

(21) Appl. No.: 13/981,494

(22) PCT Filed: Jan. 20, 2012

(86) PCT No.: PCT/EP2012/050874
§ 371 (c)(1),
(2), (4) Date: Jul. 24, 2013

(87) PCT Pub. No.: WO2012/101055
PCT Pub. Date: Aug. 2, 2012

(65) Prior Publication Data
US 2013/0305637 A1    Nov. 21, 2013

(30) Foreign Application Priority Data

Jan. 24, 2011   (IT) .............................. VR2011A0013

(51) Int. Cl.
*E04C 5/12*         (2006.01)
*F24J 2/52*         (2006.01)

(52) U.S. Cl.
CPC .............. *F24J 2/5245* (2013.01); *F24J 2/5239* (2013.01); *F24J 2/5241* (2013.01); *F24J 2/525* (2013.01); *F24J 2002/5286* (2013.01); *Y02B 10/20* (2013.01); *Y02E 10/47* (2013.01)
USPC ......... 52/223.13; 52/149; 52/173.3; 126/623; 136/245

(58) Field of Classification Search
CPC ........ Y02B 10/12; Y02B 10/20; Y02B 10/10; Y02E 10/50; Y02E 10/47; H01L 31/0482; H01L 31/0422; H01L 31/0483; H01L 31/0424; E04D 1/34; E04D 13/1407; E04D 2001/3447

USPC .................. 52/146, 148, 149, 173.3, 223.13, 52/223.14; 126/623; 136/244
See application file for complete search history.

(56) References Cited

U.S. PATENT DOCUMENTS

| | | | | |
|---|---|---|---|---|
| 997,725 A * | 7/1911 | Wilson | ........................... | 256/37 |
| 1,157,781 A * | 10/1915 | Howard | ......................... | 52/148 |
| 1,828,349 A * | 10/1931 | Williams | ....................... | 256/36 |
| 2,128,030 A * | 8/1938 | Koleno | .......................... | 267/72 |
| 3,402,518 A * | 9/1968 | Lettunich | ....................... | 52/149 |
| 4,466,423 A * | 8/1984 | Dolan et al. | .................. | 126/571 |
| 4,832,001 A * | 5/1989 | Baer | ............................ | 126/579 |
| 8,381,464 B2 * | 2/2013 | Conger | ........................ | 52/173.3 |
| 8,429,861 B2 * | 4/2013 | Conger | .......................... | 52/146 |
| 2010/0108113 A1 | 5/2010 | Taggart et al. | | |
| 2010/0294265 A1 * | 11/2010 | Baer et al. | ..................... | 126/680 |
| 2012/0180407 A1 * | 7/2012 | Rees et al. | ................... | 52/173.3 |

FOREIGN PATENT DOCUMENTS

| | | |
|---|---|---|
| DE | 102007022681 A1 | 2/2009 |
| DE | 202010001763 U1 | 5/2010 |
| DE | 202009017288 U1 | 6/2010 |
| JP | 2005133333 A | 5/2005 |
| WO | 2009040065 A2 | 4/2009 |
| WO | 2010063018 A2 | 6/2010 |

* cited by examiner

*Primary Examiner* — Adriana Figueroa
(74) *Attorney, Agent, or Firm* — David A. Guerra

(57) ABSTRACT

An anchoring device for panel supporting structures, which comprises at least one tension element (6) which is adapted to act on a supporting frame (2), which supports at least one panel (3) and rests on a resting surface (4). Means being further provided for tensioning the tension element (6) and means (7) for connecting the tension element (6) to the supporting frame (2) adapted to transmit at least partially the tension forces of the tension element (6) to the supporting frame (2) along a direction that has at least one component substantially perpendicular to the resting surface (4).

17 Claims, 9 Drawing Sheets

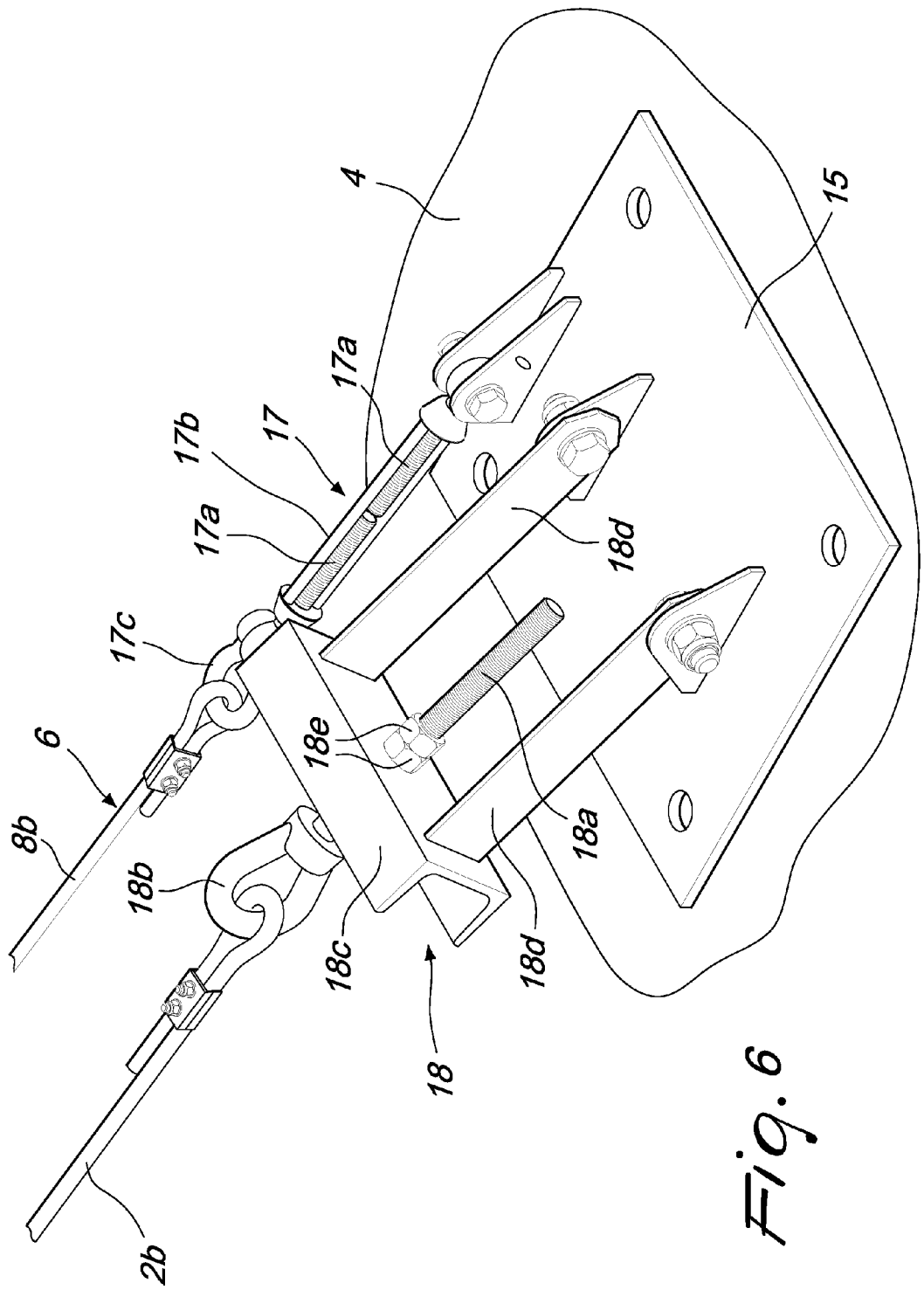

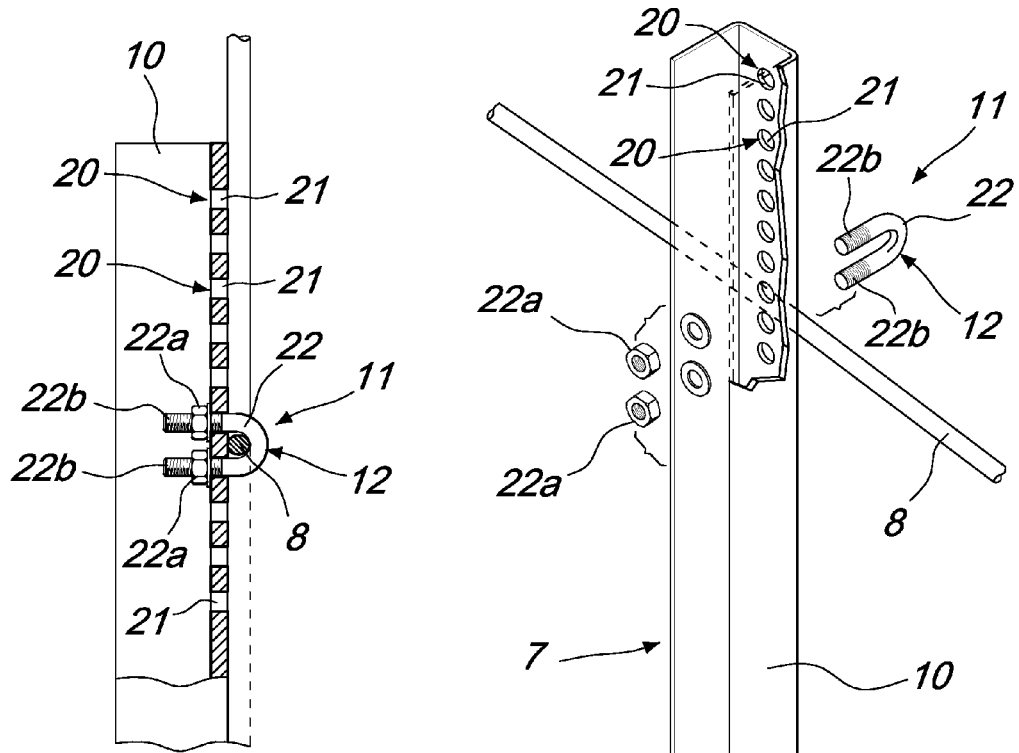
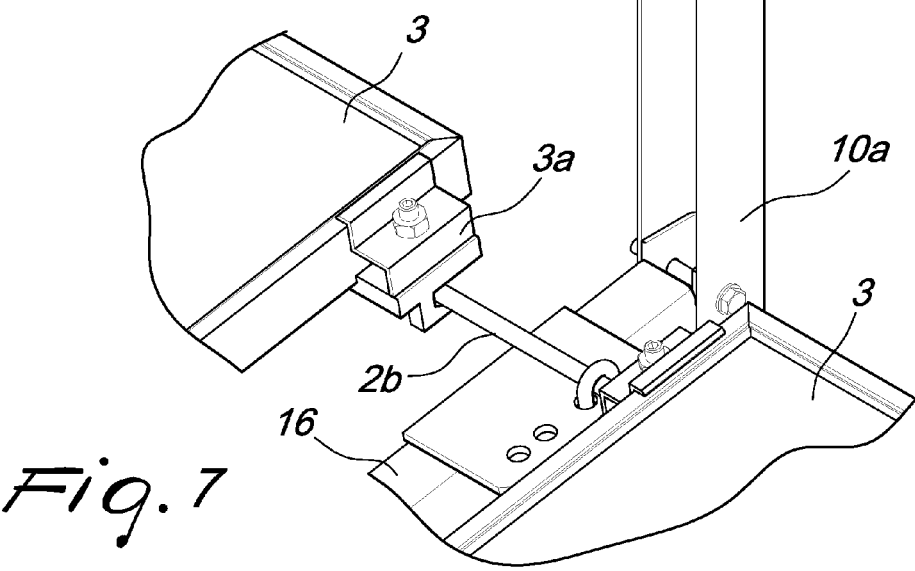
Fig. 8
Fig. 7

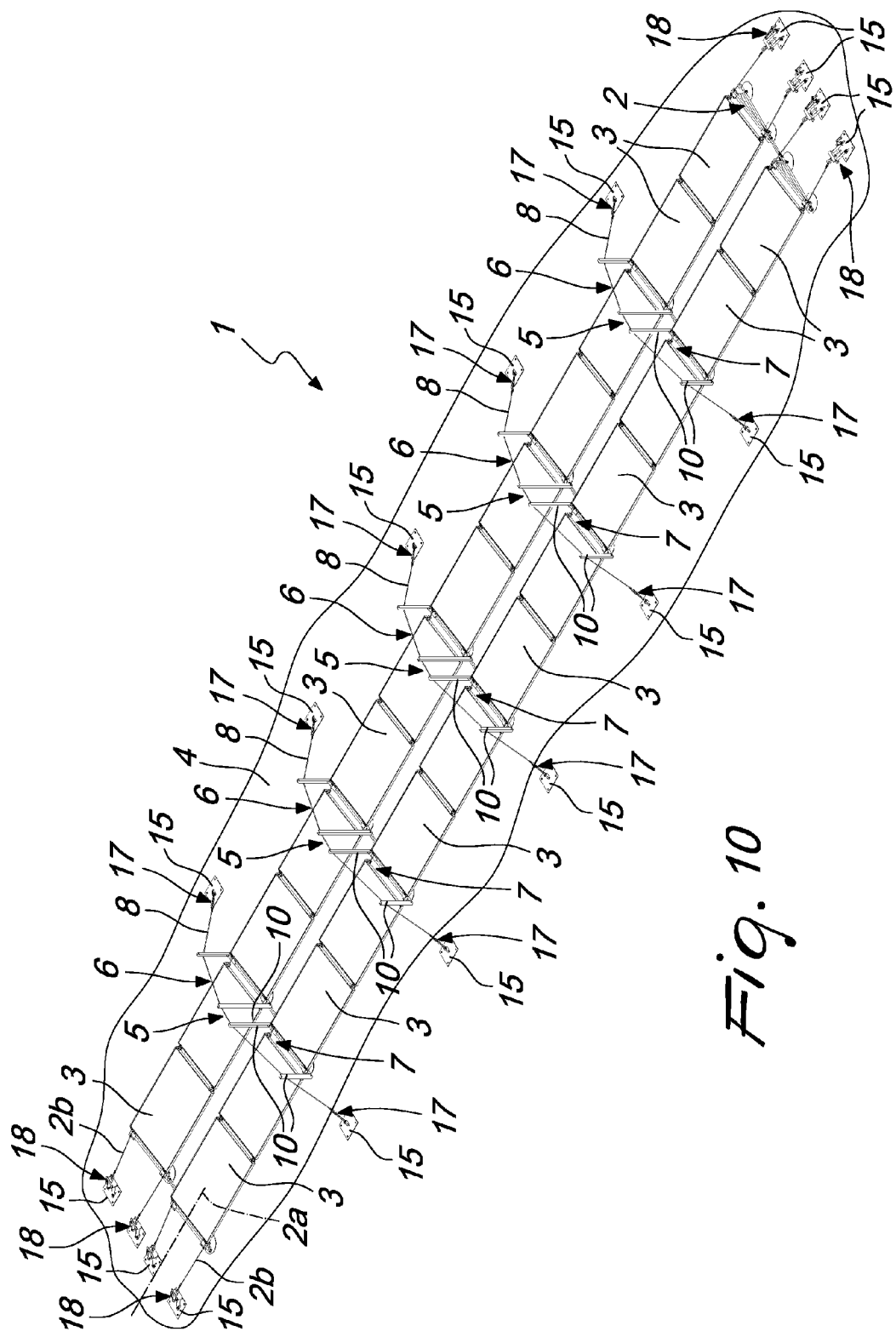

ANCHORING DEVICE FOR PANEL SUPPORTING STRUCTURES

CROSS-REFERENCE TO RELATED APPLICATIONS

This application is an U.S. national phase application under 35 U.S.C. §371 based upon co-pending International Application No. PCT/EP2012/050874 filed on Jan. 20, 2012. Additionally, this U.S. national phase application claims the benefit of priority of co-pending International Application No. PCT/EP2012/050874 filed on Jan. 20, 2012 and Italian Application No. VR2011A000013 filed on Jan. 24, 2011. The entire disclosures of the prior applications are incorporated herein by reference. The international application was published on Aug. 2, 2012 under Publication No. WO 2012/101055 A1.

BACKGROUND OF THE INVENTION

1. Field of the Invention

The present invention relates to an anchoring device for panel supporting structures.

2. Description of the Prior Art

It is known that solar panels are applied on the roofs of buildings by means of supporting structures that allow arranging the solar panels at a preset angle of inclination with respect to the horizontal.

Conceptually similar supporting structures are currently used also to support panels of other kinds, such as for example covering or cladding panels for buildings or the like.

Hereinafter, the term "panel" shall be used to equally refer to a solar panel or any type of covering panel.

One problem that is observed with these supporting structures is the fact that when the wind blows on the rear side of the panels the supporting structure tends to rise with respect to its resting surface formed on the roof.

To avoid this rise of the supporting structures, ballast is currently used which is applied to the supporting structure so as to increase its weight, or the supporting structure is fixed to its resting surface by provision of many holes in the roof for the insertion of anchoring inserts, such as expansion plugs or the like, used in combination with bolts or other similar elements.

These solutions are not entirely advantageous.

Ballast is in fact relatively expensive, both in terms of material and of transport, and often cannot be applied at all due to the limited static loads of the roof, while holes in the roof, besides entailing labor costs for their provision, can cause severe problems of water infiltration in the ceiling, with consequent damage which is difficult and expensive to repair.

SUMMARY OF THE INVENTION

The aim of the present invention is to solve the problems described above by providing an anchoring device for panel supporting structures that allows the installation of panel supporting structures in a stable manner easily on a resting surface and also allows said structures to withstand effectively the lifting action exercised by the wind.

Within this aim, an object of the invention is to propose an anchoring device for panel supporting structures that does not cause problems of water infiltration in roofs and can be used safely even in the presence of limited roof static loads.

Another object of the present invention is to provide an anchoring device for panel supporting structures that is constructively very simple to provide and furthermore has extremely competitive manufacturing and installation costs.

This aim and these and other objects that will become more apparent hereinafter are achieved by an anchoring device for panel supporting structures according to the invention, as defined in claim 1.

BRIEF DESCRIPTION OF THE DRAWINGS

Further characteristics and advantages of the invention will become more apparent from the description of some preferred but not exclusive embodiments of the anchoring device for panel supporting structures according to the invention, illustrated by way of non-limiting example in the accompanying drawings, wherein:

FIG. 6 is a perspective view of an anchoring plate of the anchoring device according to the invention;

FIG. 7 is a perspective view of a supporting pole for a tension element of the anchoring device according to the invention;

FIG. 8 is a longitudinal sectional view of a supporting pole for the tension element of the anchoring device according to the invention;

FIG. 10 is a schematic perspective view of a different arrangement of the anchoring device according to the invention.

DETAILED DESCRIPTION OF THE INVENTION

Figure 1:
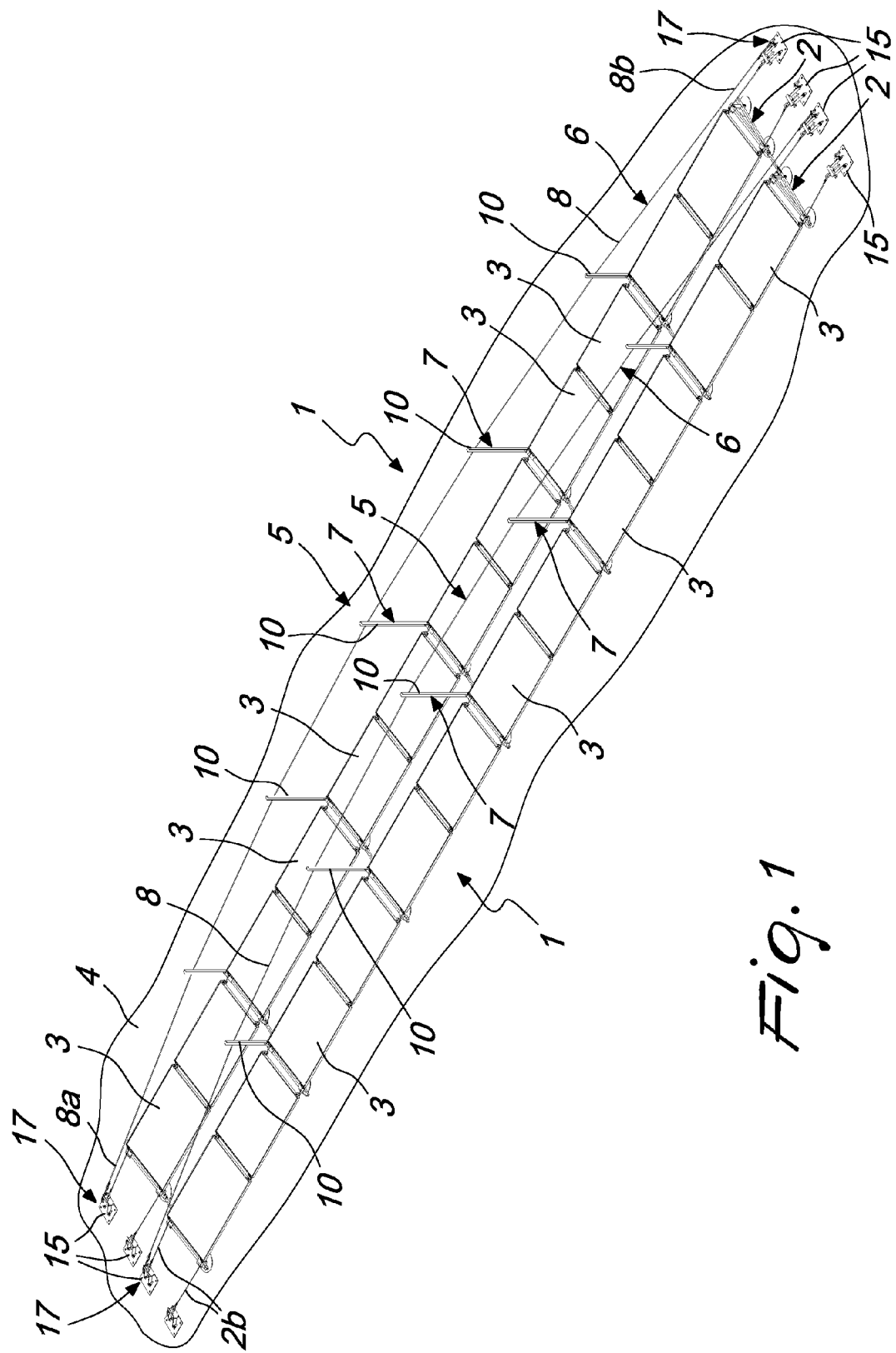
FIG. 1 is a perspective view of two supporting structures provided with the anchoring device according to the invention.
Figure 2:
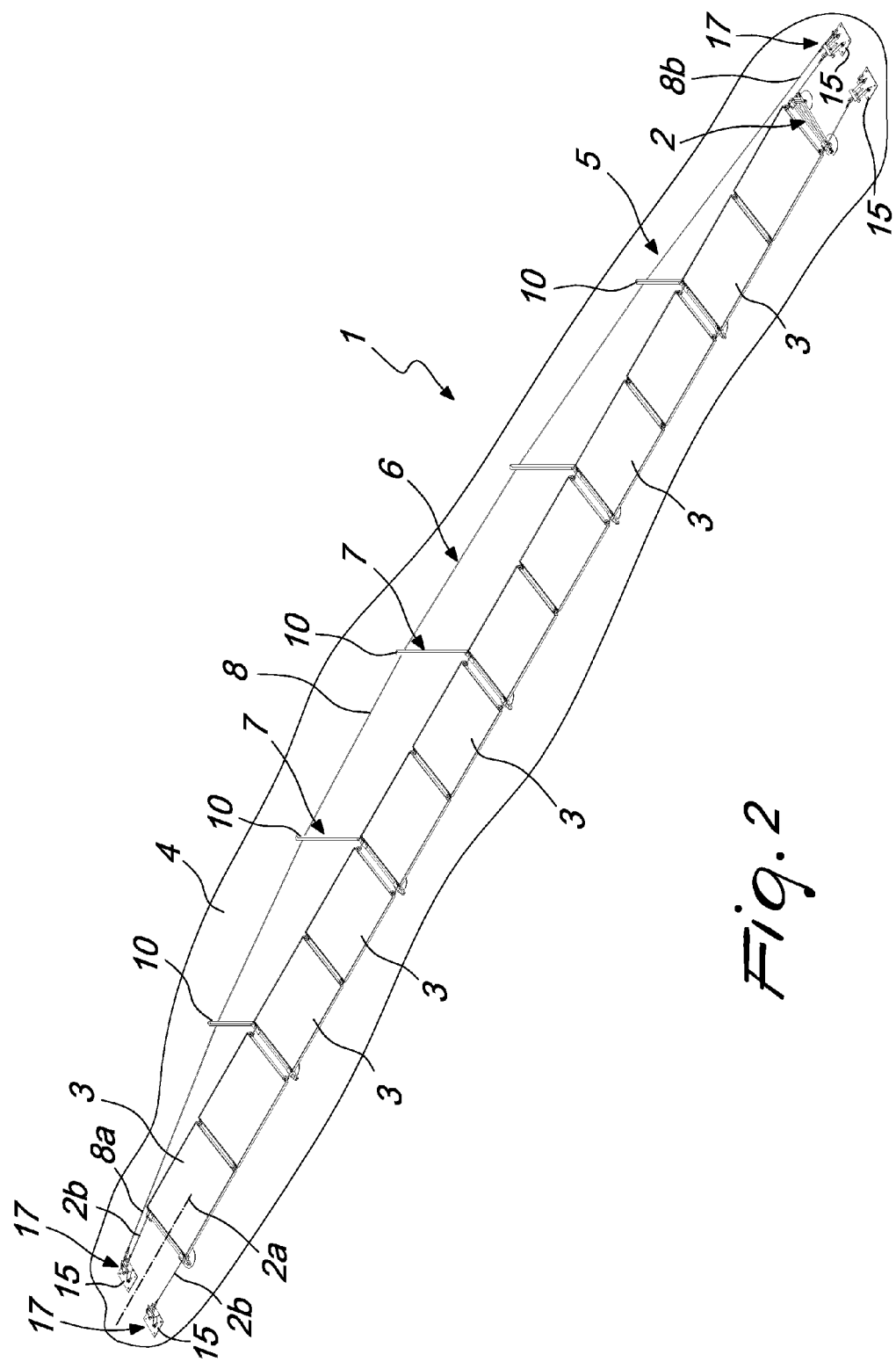
FIG. 2 is a perspective view of a supporting structure provided with the anchoring device according to the invention.
Figure 3:
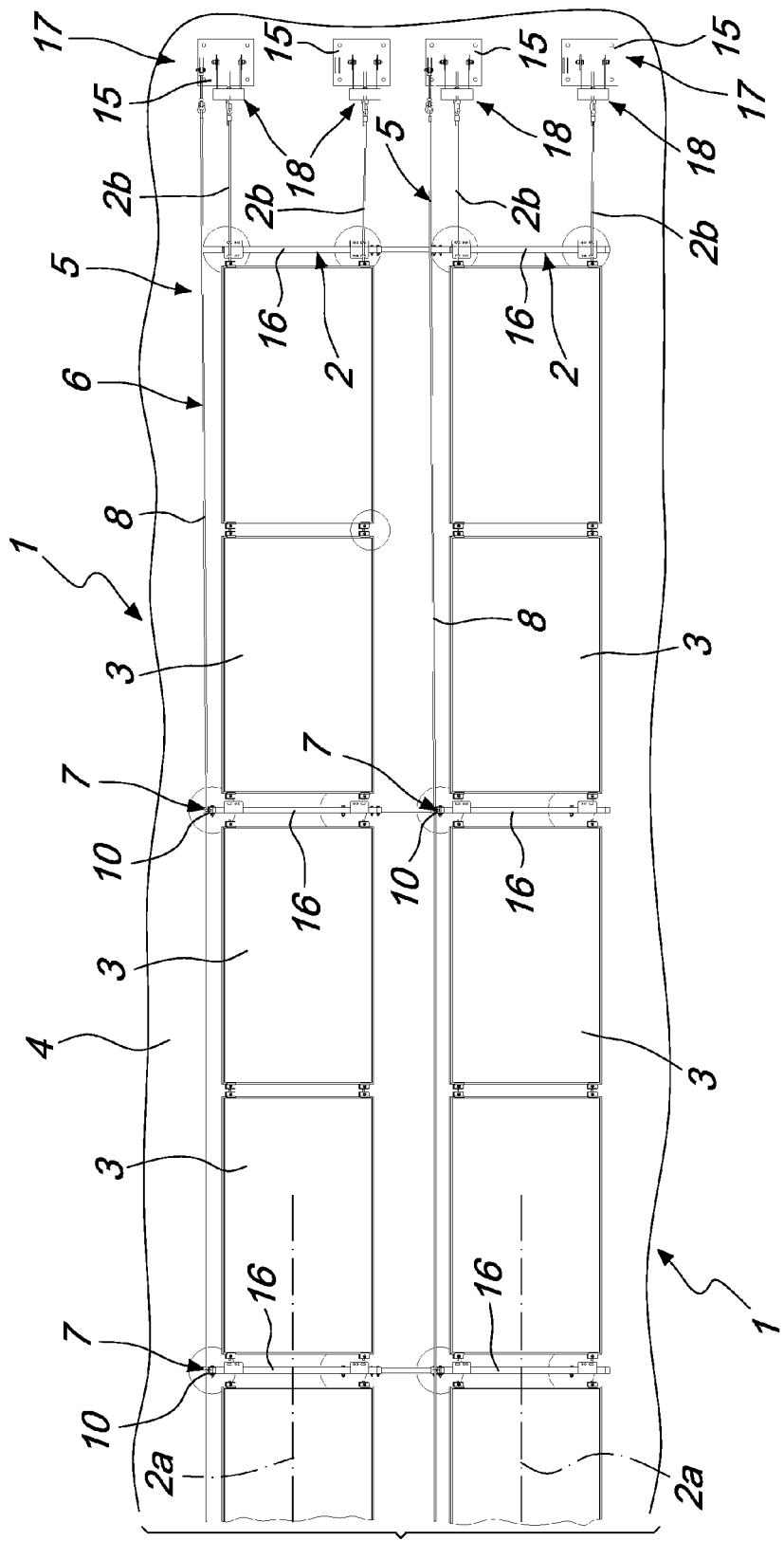
FIG. 3 is a top view of two panel supporting supporting structures provided with the anchoring device according to the invention.
Figure 4:
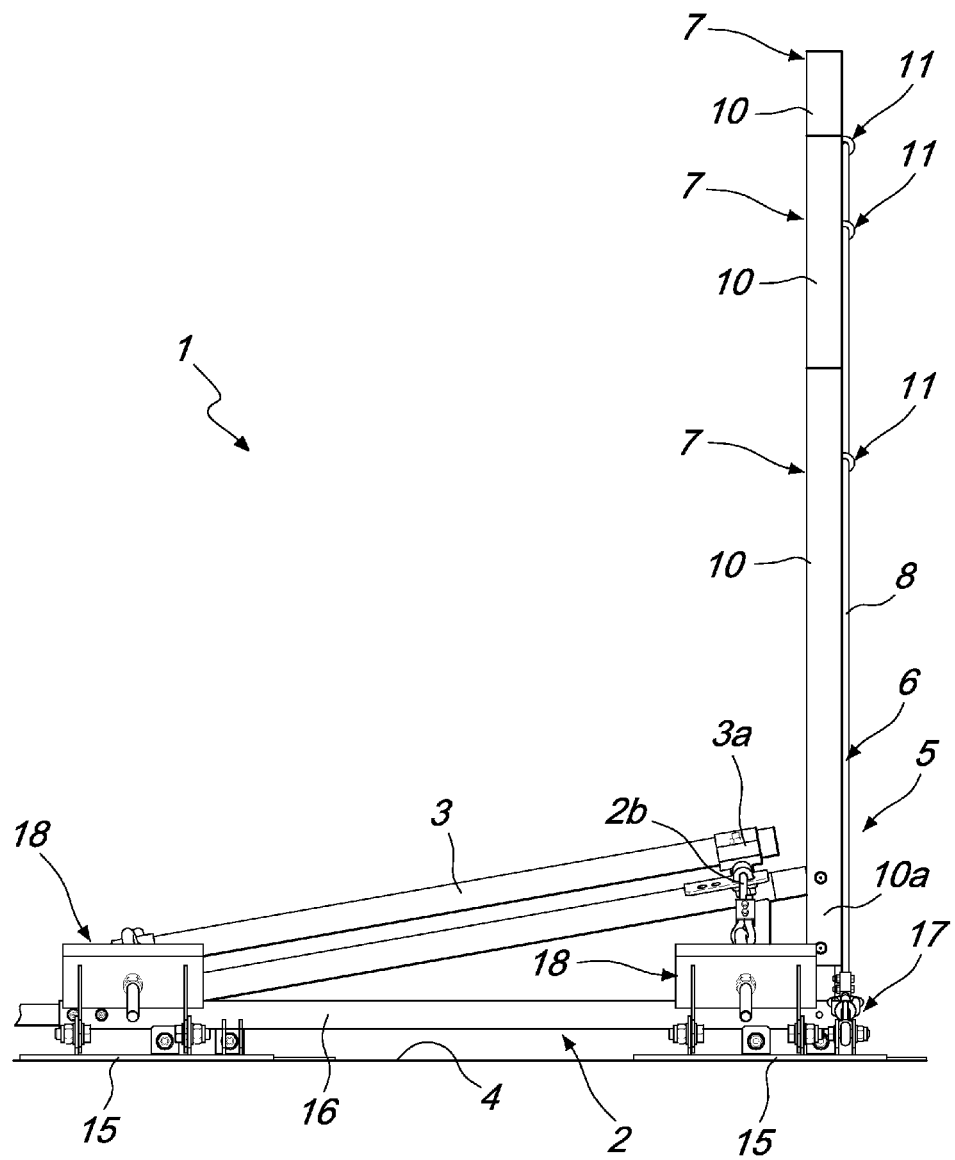
FIG. 4 is a side view of a panel supporting structure with the corresponding anchoring device according to the invention.

With reference to the cited figures, the numeral 1 generally designates panel supporting structures, each comprising at least one supporting frame 2 which is designed to support one or more panels 3.

In particular, the supporting frame 2 is designed to be installed on a resting surface 4 which is formed, by way of non-limiting example, on the roof of a building.

As shown, the supporting frame 2 is installed by using at least one anchoring device according to the invention, which is generally designated by the reference numeral 5.

The particularity of the anchoring device according to the invention resides in that it comprises at least one tension element 6, which is designed to act on the supporting frame 2.

In particular, again according to the invention, there are means for tensioning the tension element 6 and means 7 for connecting the tension element 6 to the supporting frame 2, which are adapted to transmit, at least partially, the tension forces of the tension element 6 to the supporting frame 2 along a direction that has at least one component substantially perpendicular to the resting surface 4, so as to be able to exert on the supporting frame 2 a thrust that is directed towards the resting surface 4, in order to contrast effectively the action for lifting off the resting surface 4 that can be exerted on the supporting frame 2 by the wind.

In detail, according to the preferred embodiment, the tension element 6 comprises advantageously at least one elongated element 8, which is preferably flexible and can be constituted for example by a cable, a chain or the like.

In particular, the elongated element 8 can be anchored, at its opposite ends 8a and 8b, to the resting surface 4 or to a perimetric region thereof and extends at least partially above at least one portion of the supporting frame 2. In particular, the elongated element 8 extends advantageously above a base portion of the supporting frame 2, on which it applies, directly or indirectly, a stabilization force, as will be explained in more detail hereinafter.

Conveniently, the elongated element 8 is substantially curved, with its concavity directed toward the resting surface 4.

More preferably, the elongated element 8 is arranged substantially along a catenary curve in which a concavity is directed towards the resting surface 4. The catenary arrangement allows the elongated element 8 to apply, through the connecting means 7, a considerable stabilization force on the supporting frame 2, which allows keeping the supporting frame 2 firmly in position on the resting surface 4 even in the presence of strong gusts of wind.

Advantageously, particularly if the panels 3 are constituted by solar panels, the elongated element 8 is placed behind the panels 3 with respect to their active face designed to receive light, so as to be able to act on the supporting frame 2 without casting a shadow on the panels 3. If allowed by the height of the supporting frame 2, the elongated element 8 can also remain below the panels 3.

As shown, the supporting frame 2 can extend along a longitudinal direction of extension 2a and can be able to support a plurality of panels 3 arranged mutually side by side.

More particularly, the supporting frame 2 can be constituted for example by one or more trestle-like frames, which are arranged mutually side by side along said longitudinal direction of extension 2a and support at least two cables 2b or the like, which are arranged substantially parallel to each other on an inclined plane and to which the panels 3 can be attached by means of suitable hooks 3a so as to allow their arrangement at a preset angle of inclination with respect to the resting surface 4. The cables 2b can be replaced with long, flexible or rigid elements, which merely by way of non-limiting example can be constituted by bars, chains or the like.

Nothing forbids, of course, the supporting frame 2 from being constituted by any other type of frame known per se, for supporting solar panels or any other type of panel in general.

In the illustrated embodiment, the connecting means 7 advantageously comprise one or more supporting poles 10, which are connected to the supporting frame 2 and support the elongated element 8 along its longitudinal extension.

The supporting poles 10 are arranged substantially at right angles to the resting surface 4 and can be distributed along the longitudinal direction of extension 2a of the supporting frame 2.

In practice, the elongated element 8 can extend substantially parallel to the direction of extension 2a of the supporting frame 2 or substantially parallel to the direction of extension of the cables 2b.

It should be noted that if it is more advantageous, the elongated element 8 can also be arranged substantially at right angles to said longitudinal direction of extension 2a of the supporting frame 2 or substantially at right angles to the cables 2b. In this case the supporting poles 10 are of course distributed along a direction that is substantially perpendicular to the longitudinal direction of extension 2a of the supporting frame 2 or to the direction of extension of the cables 2b. Also in this case, anchorings which are separate from the ones required for the cables 2b shall be required for the elongated element 8, as shown schematically in FIG. 10.

Advantageously, each one of the supporting poles 10 is connected, at its own base 10a, to the supporting frame 2 and has engagement means 11 by which it supports the elongated element 8.

For example, the engagement means 11 can be constituted, for each supporting pole 10, by a resting element 12 for the elongated element 8, which is arranged at the top of the corresponding supporting pole 10 or along its longitudinal extension. In particular, each resting element 12 conveniently has a concave region that is directed upward in order to accommodate the elongated element 8 and can be provided for example by a ring or other equivalent element. Moreover, each supporting element can be made of a material that has a low friction coefficient with respect to the elongated element 8.

Advantageously, there are adjustment means which make it possible to vary adjustably the distance between the engagement means 11 and the base 10a of each supporting pole 10.

It should be noted that these adjustment means allow mainly to arrange correctly, along a catenary curve, the elongated element 8, distributing the tension force of the elongated element 8 over the supporting poles 10, and secondarily also contribute to the tension of the elongated element 8.

Advantageously, according to a first embodiment not shown in the figures, the adjustment means can be constituted, for each supporting pole 10, by a threaded portion that connects the engagement means 11 and more particularly the corresponding resting element 12 to the corresponding supporting pole 10.

In practice, by means of the rotation of said threaded portions of each supporting pole 10, it is possible to vary individually and very accurately the height of the resting elements 12 with respect to the base 10a of the supporting poles 10, thus having the possibility to modulate, according to the requirements, the transmission of the tension force of the elongated element 8 to the supporting frame 2, thus making it possible to give the supporting frame 2 the desired stability against the action of the wind.

According to another possible embodiment, said adjustment means are obtained by providing, on each supporting pole 10, a plurality of fixing seats 20, which are mutually spaced, along the longitudinal extension of the corresponding supporting pole 10, and can be engaged selectively by the engagement means 11 of the elongated element 8.

More particularly, said fixing seats 20 are constituted by holes 21, which are arranged at different heights with respect to the base 10a of the corresponding supporting pole 10 and in which a cable clamp 22 or similar support is intended to be inserted selectively, providing in practice the resting element 12 of the elongated element 8. Thanks to the holes 21, the clamp 22 can be fixed to the corresponding supporting pole 10, at the desired height from the resting surface 4. For example, the fixing of the clamp 22 to the corresponding supporting pole 10 can be ensured by means of bolts 22a that engage two threaded arms 22b of the clamp 22 that can be inserted in two separate holes 21.

Advantageously, the height at which the clamp 22 of each supporting pole 10 is to be arranged can be determined, by means of a vector calculation algorithm, so that the elongated element 8 can transmit the desired force onto each clamp 22.

Advantageously, in order to allow a correct catenary arrangement of the elongated element 8, the vertical extension of the various supporting poles 10 can increase progressively, proceeding from the longitudinal ends of the supporting frame 2 toward the intermediate part of the supporting frame 2.

Conveniently, as shown in the figures, the elongated element 8 is connected to the resting surface 4, at its two opposite ends 8a, 8b, by means of a pair of anchoring plates 15, which can be fixed to the resting surface 4 or to its perimeter by means of expansion plugs and bolts or other equivalent elements.

Advantageously, the tension means of the elongated element 8 can comprise threaded coupling means 17 or other traction members that operate between at least one of the ends 8a, 8b of the elongated element 8 and the corresponding anchoring plate 15. More preferably, the threaded coupling means 17 are provided between both ends 8a and 8b of the elongated element 8 and the corresponding anchoring plate 15.

Merely by way of non-limiting example, the threaded coupling means 17 can be constituted by a pair of threaded rods 17a that can be screwed into an internally threaded sleeve 17b, one being connectable to the elongated element 8 by means of a connecting ring 17c and the other one being articulated to the anchoring plate 15 about a rotation axis that is substantially parallel to the resting surface 4.

Conveniently, according to the embodiment illustrated in FIGS. 1 to 9 and, more particularly, as can be seen in FIG. 6, the same anchoring plates 15 that allow the anchoring of the elongated element 8 can also support tensioning means 18, which are adapted to perform the tensioning of one of the two cables 2b. For example, said tensioning means 18 can comprise a threaded pin 18a, which has, at one end, an eye 18b for its connection to a respective cable 2b and is inserted in a hole that is formed in a cross-member 18c which is connected, by means of two arms 18d, to a corresponding anchoring plate 15.

One or more actuation nuts 18e can be screwed along the threaded pin 18a and are designed to be tightened against the face of the cross-member 18c that lies opposite from the eye 18b, so as to adjust the tension of the cable 2b that is connected to the threaded pin 18a It should be noted that the other cable 2b also can be fixed to the resting surface 4 or to its perimeter by means of two respective anchoring plates 15 provided with corresponding tensioning means 18.

Of course, nothing forbids the provision of the threaded coupling means 17 as well with the tensioning means 18 described above for performing the tensioning of the tension element 8.

In this case, of course, the threaded pin 18a of the tensioning means 18 is conveniently connected, by means of the eye 18b, to one of the ends 8a, 8b of the elongated element 8, which can be tensioned consequently by the screwing, along the threaded pin 18a, of respective actuation nuts 18e, which are tightened against a corresponding cross-member 18c, which is connected to a corresponding anchoring plate 15.

Preferably, the supporting frame 2 is provided with a plurality of stiffening bars 16, which are arranged transversely and mutually spaced with respect to the longitudinal direction of extension 2a of the supporting frame 2.

As can be seen from the figures, each one of the supporting poles 10 is conveniently connected to, or arranged at, a respective stiffening bar 16 at its base 10a.

Figure 5:
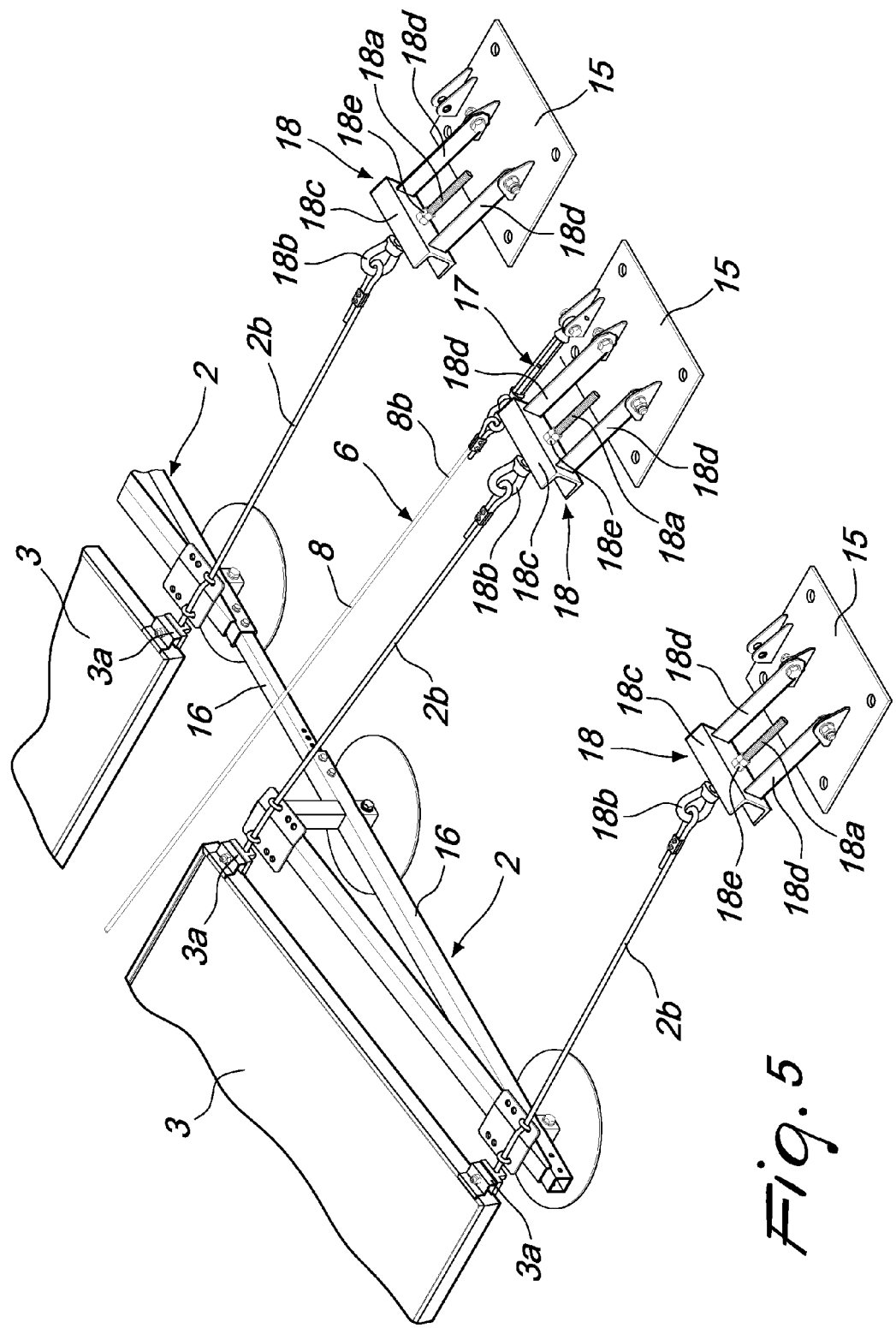
FIG. 5 is an enlarged-scale perspective view of a detail of two panel supporting structures and of the anchoring device according to the invention.
Figure 9:
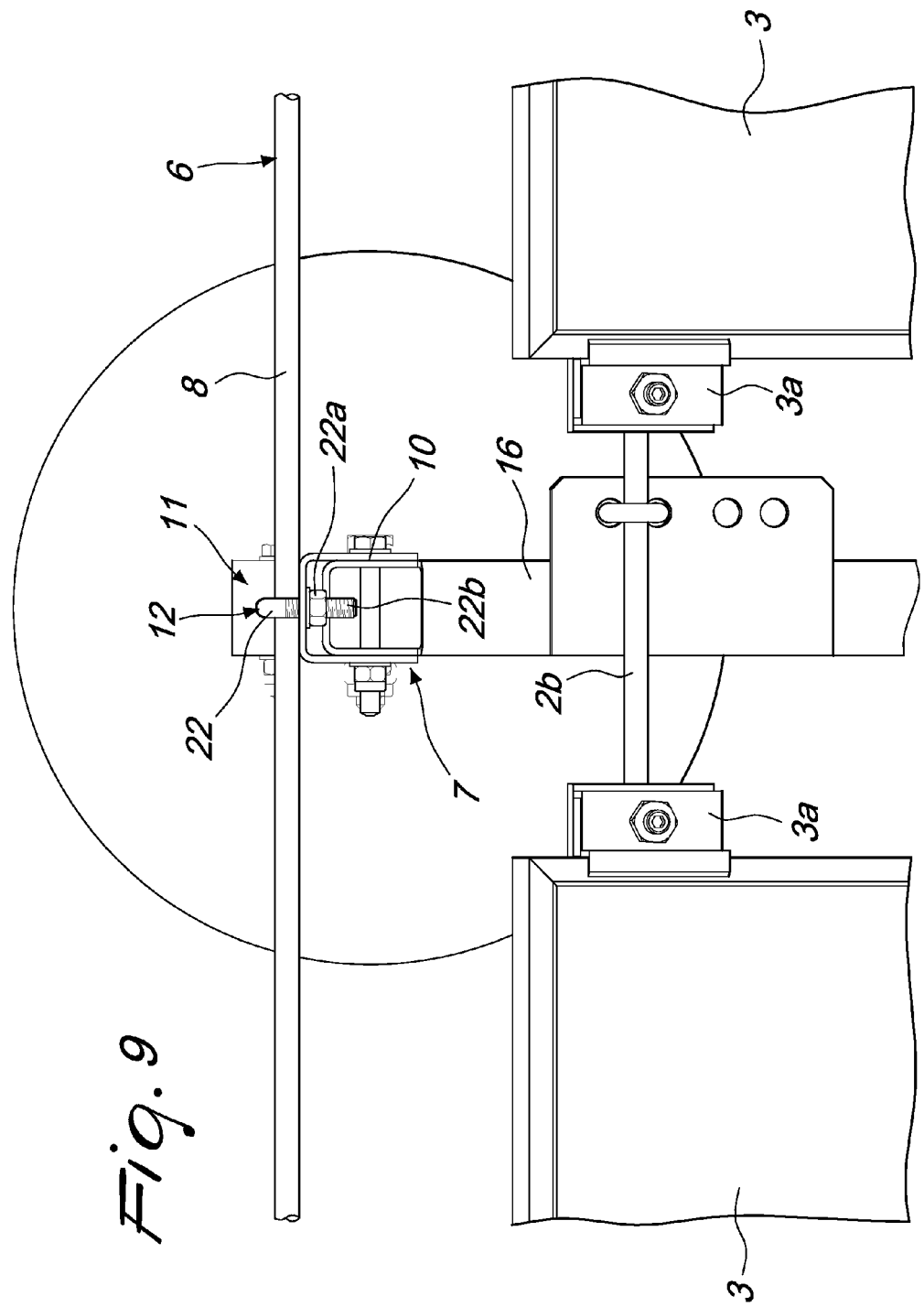
FIG. 9 is an enlarged-scale top view of a detail of a panel supporting structure and of the corresponding anchoring device according to the invention.

As shown in particular in the example of FIG. 5, by means of the stiffening bars 16 it is possible to connect the supporting frame 2 to another panel supporting surface that is adjacent thereto so as to provide a single structure.

With reference to FIG. 10, it should be noted that an elongated element 8 can stabilize supporting frames 2 of one or more rows of panels 3, using for each row one or more supporting poles 10. Each supporting pole 10 can rest on any point of the supporting frame 2. Of course, one or more elongated elements 8 and one or more rows of panels 3 can be present.

The use of the anchoring device according to the invention is as follows.

The supporting frame 2 is placed on the resting surface 4. The elongated element 8 is caused to pass on the resting elements 12 or, more particularly, on the clamps 22 of the various supporting poles 10 and is anchored at its ends 8a and 8b to the resting surface 4 or to the perimeter thereof by means of the anchoring plates 15.

Initially, the distance between the various resting elements 12 or the clamps 22 and the base 10a of the corresponding supporting pole 10 is adjusted by means of the threaded portions or by arrangement of the clamps 22 in the selected holes 21, so as to give the elongated element 8 a catenary shape in which the concavity is directed towards the resting surface 4.

The tension force of the elongated element 8 can then be adjusted by acting on the threaded coupling means 17 of the anchoring plates 15. If necessary, it is possible to further adjust the distance between the various resting elements 12 or the clamps 22 and the base 10a of the supporting poles 10 in order to obtain the desired stability force.

In this manner, the elongated element 8 arranged in a catenary configuration transmits, by means of the supporting poles 10 that support it, its tension force to the supporting frame 2 along a direction that is directed towards the resting surface 4 and is substantially perpendicular to said resting surface 4, thus achieving the firm anchoring of the supporting frame 2 to the resting surface 4.

From what has been described above it is evident that the invention achieves the proposed aim and objects and in particular the fact is stressed that thanks to the tension element it is possible to apply to the supporting frame that supports the panels a force that is capable of giving stability to the entire structure, avoiding the rise of the supporting frame, without the need to use ballast and/or numerous holes in the roof.

Another advantage of the invention is that it allows an installation of supporting frames for panels on resting surfaces that have limited static loads. In static conditions, in the absence of lifting wind, the stabilization force exerted by the elongated element 8 on the resting surface is in fact much lower than the force that the ballast would exert to to overcome the lifting force of the wind. This occurs because the wind that attempts to lift the supporting frame, even by a few millimeters, further tensions the elongated element, generating a considerable dynamic stability force that keeps the supporting frame in place. This difference between static and dynamic stability force allows the application of panel supporting structures on resting surfaces that have limited static loads, contrasting wind forces, without using ballast or holes in the resting surface.

It should also be noted that the anchoring device according to the invention can be used effectively to fix supporting structures that have any type of configuration and are designed to support not only solar panels but also sheet-like elements or panels of another type, such as for example covering panels or cladding panels of buildings or the like.

All the characteristics of the invention indicated above as advantageous, convenient or the like may also be omitted or be replaced with equivalents.

The individual characteristics described with reference to general teachings or to particular embodiments can all be present in other embodiments or can replace characteristics in these embodiments.

The invention thus conceived is susceptible of numerous modifications and variations, all of which are within the scope of the appended claims.

In practice, the materials used, so long as they are compatible with the specific use, as well as the shapes and dimensions, may be any according to the requirements.

All the details may furthermore be replaced with other technically equivalent elements.

The disclosures in Italian Patent Application No. VR2011A000013 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. An anchoring device for panel supporting structures, said anchoring device comprising:
    at least one support frame configured to support at least one panel and rests on a resting surface;
    at least one tension element configured to act on said supporting frame, said tension element having at least one elongated element;
    a tensioning element configured to provide tension to said tension element; and
    a connecting element configured to connect said tension element to said supporting frame being provided and configured to transmit at least partially a tension force of said tension element to said supporting frame along a direction that has at least one component substantially perpendicular to said resting surface, said connecting element having at least one supporting pole for said elongated element, which is arranged substantially at right angles to said resting surface and is connected, at a base of said supporting pole, to said supporting frame, said supporting pole having a respective engagement element with said elongated element;
    an adjustment element configured to adjustably vary a distance between said engagement element and said base of said supporting pole;
    wherein said tensioning element comprise a threaded coupling which operate between at least one of said ends of said elongated element and an anchoring plate, said anchoring plate is fastened to one of said resting surface, and a peripheral region of said resting surface.

2. The anchoring device according to claim 1, wherein said elongated element is anchored, at opposite ends of said tension element, to one of said resting surface, and a perimetric region of said resting surface, and wherein said elongated element extends at least partially above at least one portion of said supporting frame.

3. The anchoring device according to claim 2, wherein said elongated element has a substantially curved shape with a concavity directed toward said resting surface.

4. The anchoring device according to claim 2, wherein said elongated element extends substantially along a catenary, with a concavity directed toward said resting surface.

5. The anchoring device according to claim 4, wherein said tensioning element comprise a threaded rod configured to adjust a height of a resting element associated with said elongated element to create said catenary of said elongated element, and wherein said elongated element is a cable.

6. The anchoring device according to claim 1, wherein said supporting frame extends along a longitudinal direction, said elongated element being one of arranged substantially parallel, and arranged substantially at right angles with respect to said longitudinal direction of said support frame.

7. The anchoring device according to claim 1, wherein said adjustment element comprise, on said supporting pole, a plurality of fixing seats, which are distributed along a longitudinal extension of said supporting pole and is engaged selectively by said engagement element.

8. The anchoring device according to claim 1, wherein said adjustment element comprise a threaded portion, which connects said engagement element with said supporting pole.

9. The anchoring device according to claim 1, wherein said threaded coupling comprise a threaded coupling tensioning element which has a threaded pin connected, at one end of said threaded pin, to said elongated element and inserted in a hole, defined in a cross-member, connected to said anchoring plate, at least one actuation nut configured to be screwed along said threaded pin for tensioning said elongated element.

10. The anchoring device according to claim 9, wherein said cross-member is connected to said anchoring plate by at least two arms, with said threaded pin positioned between said arms.

11. The anchoring device according to claim 1, wherein said supporting frame comprise at least one trestle arranged along a longitudinal direction of said supporting frame, said trestle is configured to support at least two cables, said at least two cables are arranged substantially parallel to each other on an inclined plane and to which said panel is attached so as to allow the arrangement of said panel at a preset angle of inclination with respect to said resting surface.

12. The anchoring device according to claim 11, wherein said at least two cables having a catenary shape configured to contribute to stabilizing said panel by pushing down toward said resting surface.

13. The anchoring device according to claim 11 further comprising a threaded member configured to adjust a height of said trestle to create said catenary of said elongated element, wherein said elongated element is a cable.

14. The anchoring device according to claim 1, wherein said support pole further comprising a resting element for attaching said engagement element to said elongated element, said resting element is arranged at one of a top of said supporting pole, and along a longitudinal axis of said support pole, said resting element has a concave region that is directed upward in order to accommodate said elongated element.

15. The anchoring device according to claim 1, wherein said threaded coupling is constituted by a pair of threaded rods each engageable with an internally threaded sleeve, a first of said threaded rods being connectable to said elongated element by a connecting ring and a second of said threaded rods being articulated to said anchoring plate about a rotation axis that is substantially parallel to said resting surface.

16. An anchoring device for panel supporting structures, said anchoring device comprising:
    at least one support frame configured to support at least one panel and rests on a resting surface;
    at least one tension element configured to act on said supporting frame, said tension element comprising at least one elongated element having opposite ends, and extends at least partially above at least one portion of said supporting frame;

a coupler for tensioning said tension element, said coupler being associated between at least one of said ends of said elongated element and an anchoring plate fastened to one of said resting surface, and a peripheral region of said resting surface;

at least one supporting pole for connecting said tension element to said supporting frame being provided and configured to transmit at least partially a tension force of said tension element to said supporting frame along a direction that has at least one component substantially perpendicular to said resting surface, said supporting pole being arranged substantially at right angles to said resting surface, said supporting pole having a base connected to said supporting frame, said supporting pole having a respective engagement element with said elongated element; and an adjustment element for varying adjustably a distance between said engagement element and said base of said supporting pole, wherein said adjustment element comprise, on said supporting pole, a plurality of fixing seats, which are distributed along a longitudinal extension of said supporting pole and is engaged selectively by said engagement element, wherein said adjustment element having a threaded portion, which connects said engagement element with said supporting pole.

17. The anchoring device according to claim 16, wherein said coupler comprise a threaded coupling tensioning element which have a threaded pin connected, at one end of said threaded pin, to said elongated element and inserted in a hole, defined in a cross-member, connected to said anchoring plate, at least one actuation nut configured engageable along said threaded pin for tensioning said elongated element.

* * * * *

UNITED STATES PATENT AND TRADEMARK OFFICE
CERTIFICATE OF CORRECTION

| | | |
|---|---|---|
| PATENT NO. | : 8,931,222 B2 | Page 1 of 1 |
| APPLICATION NO. | : 13/981494 | |
| DATED | : January 13, 2015 | |
| INVENTOR(S) | : Alberto Di Gaetano | |

It is certified that error appears in the above-identified patent and that said Letters Patent is hereby corrected as shown below:

On the title page item (76), the first name "Di Gaetano" and last name "Alberto" are reversed on the issued patent.

The inventor's first name should be "Alberto" and the last name should be "Di Gaetano".

Signed and Sealed this
Twenty-eighth Day of April, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,931,222 B2 |
| APPLICATION NO. | : 13/981494 |
| DATED | : January 13, 2015 |
| INVENTOR(S) | : Alberto Di Gaetano |

It is certified that error appears in the above-identified patent and that said Letters Patent is hereby corrected as shown below:

On the title page item (12), delete "Alberto" and insert --Di Gaetano--.

On the title page item (76), the first name "Di Gaetano" and last name "Alberto" are reversed on the issued patent.

The inventor's first name should be "Alberto" and the last name should be "Di Gaetano".

This certificate supersedes the Certificate of Correction issued April 28, 2015.

Signed and Sealed this
Nineteenth Day of May, 2015

Michelle K. Lee
*Director of the United States Patent and Trademark Office*